Patented Apr. 1, 1941

2,237,125

UNITED STATES PATENT OFFICE 2,237,125

NEUTRALIZATION OF RUBBER HYDROCHLORIDE CEMENTS AND PRODUCTS MADE THEREFROM AND PROCESS PERTAINING THERETO

Charles W. Walton, Stow, Ohio, assignor to Wingfoot Corporation, Wilmington, Del., a corporation of Delaware No Drawing. Application July 9, 1935, Serial No. 30,516

5 Claims. (Cl. 18—57)

This invention relates to a method of preparing rubber hydrochloride and rubber hydrochloride films and includes a new rubber hydrochloride and more particularly a new rubber hydrochloride film.

Rubber hydrochloride has previously been formed by treating a rubber cement with hydrogen chloride, as, for example, by passing hydrogen chloride gas through a rubber cement. The preferred method of producing rubber hydrochloride has been to introduce an excess of hydrogen chloride into the rubber cement and allow the hydrogen chloride to react on the rubber to produce the rubber hydrochloride. In preparing rubber hydrochloride in this manner it is desirable to test the progress of the reaction of the hydrogen chloride on the rubber from time to time and stop the reaction when the desired hydyrochlorination has taken place. For example, a rubber hydrochloride containing about 29 to 30.5% of chlorine may be used to give a non-tacky film or other product. Rubber hydrochlorides containing less than about 28 or 29% of chlorine are tacky or sticky. The hydrochlorination can be carried further than 30.5% of chlorine and products containing higher percentages of chlorine may be made into films, etc., preferably by incorprating plasticizers into them.

In preparing films, etc. of rubber hydrochloride the rubber hydrochloride cement has previously been washed with water to remove excess hydrogen chloride, the resulting product has then been dried and then redissolved into a cement to be cast into films, etc. This involves several operations which are unnecessary according to the present procedure although it has the advantage that one organic solvent may be employed for the production of the rubber cement to be hydrochlorinated and another solvent may be used to dissolve the rubber hydrochloride for the production of the film.

The present invention includes neutralization of the reacted cement of the rubber hydrochloride by a solid alkaline substance which reacts with the excess hydrogen chloride and causes separation of the excess hydrogen chloride as an insoluble product. This insoluble product is then filtered off and excess chlorine introduced as hydrogen chloride is thus removed from the solution. Preferably the alkaline substance is employed in such quantities and in such a way as to remove all of the excess hydrogen chloride and thus produce a neutral cement which contains no chlorine-containing products except those produced from constituents originally present in the rubber. If any water is present in the cement a dehydrating agent is employed which removes the water. One suitable reagent for the process is anhydrous soda ash. This removes any water present in the cement and converts the excess hydrogen chloride into sodium chloride which is subsequently removed from the cement.

The preferred method of carrying out the process includes the preparation of rubber cement from commercial benzene. This contains a small amount of water, possibly as much as one-tenth of one per cent. After reaction with the hydrogen chloride which is usually introduced as a gas, solid sodium carbonate is added in granular form as soda ash. This removes all excess hydrochloric acid as sodium chloride. Sodium carbonate, or soda ash, likewise may act on other acids present in the cement such as stearic acid, oleic acid and linoleic acid which are present in small amounts in rubber.

The soda ash is preferably employed in sufficient quantity and allowed to contact with the rubber cement for a sufficient length of time to remove all of the free hydrogen chloride from the reacted cement. The neutralization may be so regulated as to produce an end product which is less acid than brom phenol blue. The brom phenol blue test is conducted as follows: To test a benzene cement of rubber hydrochloride, the rubber hydrochloride is precipitated by addition of alcohol with stirring and analysis made of the supernatant solvent. In the case of a solid product, such as film, this product is leached or extracted by a 50–50% mixture of benzene and alcohol. In either case, to the solvent is added brom phenol blue whose pH range in aqueous solution is 3–4.6. In the absence of free hydrogen chloride this indicator gives a neutral to faintly alkaline color.

The cement may be neutralized by filtering the reacted cement through a bed of soda ash or by stirring granular soda ash in the reacted cement and then separating it therefrom by filtration. By either process the neutralization products are removed from the cement. They form on the soda ash surface and are thus prevented from passing thru the filter bed. Compounds which have a detrimental effect on the rubber hydrochloride or films or other products made therefrom are thus removed.

Various grades and sizes of soda ash may be used to give satisfactory results. Preferably a free flowing soda ash is used. Soda ash most of which is 80–200 mesh and of which at least 50% is 100–150 mesh will give satisfactory results. This may be mixed with filter aids such as diatomaceous earth, etc.

A filter bed may, for example be made up by placing two pieces of flannel cloth on the filter support and then covering this with a 1" layer of soda ash approximately 80% of which is 100–150 mesh. As the cement passes through the soda ash all the excess hydrogen chloride is neutralized and the neutralization products are removed from the cement. The filtrate may be cast into films or it may be used for other purposes.

Instead of flannel cloth two pieces of filter paper may first be spread on the filter support and this may then be covered with one inch of free flowing soda ash. In one example the rubber hydrochloride cement produced by the reaction of hydrogen chloride on rubber dissolved in benzene to produce a cement containing 10.2% of rubber hydrochloride was diluted to a cement of 7.7% rubber hydrochloride content. The filtered product gave an improved cement from which an improved film was obtained. Such an improved rubber hydrochloride can be used as for coating and the rubber hydrochloride may be recovered and used as desired.

It was found desirable in certain cases to use cotton on the edges of the filter paper to prevent the passage of fine soda ash under the filter paper into the filtrate.

A preferred method of carrying out the reaction to produce rubber hydrochloride cement which is free from all excess HCl and salts formed by the neutralization of the excess HCl, involves stirring the reacted rubber cement with a solid alkali of the type referred to, which neutralizes excess hydrogen chloride and forms a product which in the absence of water is insoluble. For example, soda ash stirred into a rubber hydrochloride cement which contains a small fraction of a percent of water removes the water from the cement, reacts with all free hydrogen chloride and removes it as sodium chloride. The soda ash together with the neutralization products are then filtered off through any suitable filter. A filter aid such as diatomaceous earth may be added if desired. In one laboratory example, one part by weight of free flowing soda ash was stirred into fifteen parts by weight of a rubber hydrochloride cement containing 7% of rubber hydrochloride. One part by weight of diatomaceous earth per 480 parts by weight of rubber hydrochloride cement was likewise stirred into the cement to form a slurry. Stirring was continued for 30 minutes. A precoat of 2½ grams of diatomaceous earth was laid down on the 4 square inch filtration bed, after which filtration of the rubber hydrochloride slurry was conducted. The filtrate was neutral although it contained some suspended particles, probably soda ash. Films prepared from the above filtrate were likewise neutral.

In another example, of semi-plant scale proportions, a filter press of 1452 square inches filter area was used. A pre-coat consisting of 1750 grams of diatomaceous earth was laid down on the filter cloths of the filter press. One pound of free-flowing soda ash per 2 gallons of rubber hydrochloride cement was used for neutralization. One ounce of diatomaceous earth per 2 gallons of cement was added as a filter aid. Neutralization was obtained by stirring the above slurry consisting of rubber hydrochloride cement with soda ash and filter aid for a period of 4 hours prior to filtration. Filtration proceeded rapidly through the pre-coat of diatomaceous earth. A perfectly clear, colorless, neutral cement was obtained. This was used directly for the casting of films or for the preparation of other rubber hydrochloride products. Neutrality of the cement can be controlled by regulating the time of contact of the soda ash and cement or the amount of soda ash may be varied.

In the above examples benzene has been employed as the solvent for the cement. Other solvents, such as chloroform, etc. may be used. In preparing films from the improved cement, plasticizers, etc. may be added as is known in the art.

I claim:

1. A foil composed essentially of neutralized rubber hydrochloride which foil is free from the products of the neutralization.

2. A foil composed essentially of a rubber hydrochloride which contains about 29 to 30.5% of chlorine and is free from acid (as determined by the brom phenol blue test set forth herein), which foil contains no chlorine-containing products except those derived from rubber constituents.

3. The method of producing rubber hydrochloride which comprises gassing a rubber cement with hydrogen chloride gas and stopping the reaction by neutralizing the cement with solid sodium carbonate.

4. The method of neutralizing a rubber hydrochloride cement containing free hydrogen chloride which comprises bringing it into intimate contact with an excess of solid sodium carbonate and then separating the sodium carbonate and products of neutralization therefrom.

5. The method of preparing a neutralized film of rubber hydrochloride which comprises preparing a rubber hydrochloride cement containing free hydrogen chloride, neutralizing the free hydrogen chloride by stirring an excess of free flowing, granular sodium carbonate with the cement, and removing the excess sodium carbonate and products of neutralization from the cement by filtration.

CHARLES W. WALTON.